(12) United States Patent
Paris

(10) Patent No.: US 6,296,401 B1
(45) Date of Patent: Oct. 2, 2001

(54) METHOD FOR FUSION PIGTAILING AN OPTICAL FIBER TO AN INTEGRATED OPTICAL DEVICE AND RESULTANT STRUCTURES

(75) Inventor: Bertrand Paris, Avon (FR)

(73) Assignee: Conring Incorporated, Corning, NY (US)

( * ) Notice: Subject to any disclaimer, the term of this patent is extended or adjusted under 35 U.S.C. 154(b) by 0 days.

(21) Appl. No.: 09/665,832

(22) Filed: Sep. 20, 2000

(30) Foreign Application Priority Data

Sep. 21, 1999 (EP) .................................................. 99-11787

(51) Int. Cl.⁷ .................................................. G02B 6/255
(52) U.S. Cl. .................................. 385/96; 385/49; 385/88
(58) Field of Search ........................... 385/49, 96, 88–94

(56) References Cited

U.S. PATENT DOCUMENTS

| | | | |
|---|---|---|---|
| 4,943,130 | * 7/1990 | Dannoux et al. ................. | 350/96.12 |
| 5,107,535 | * 4/1992 | Hakogi ................................... | 385/49 |
| 5,185,835 | 2/1993 | Vial et al. .............................. | 385/49 |
| 5,311,604 | 5/1994 | Rogner et al. ......................... | 385/14 |
| 6,122,423 | 9/2000 | You ....................................... | 385/49 |

FOREIGN PATENT DOCUMENTS

| | | |
|---|---|---|
| 0722102 | 7/1996 | (EP) . |
| WO9641222 | 12/1996 | (WO) . |

* cited by examiner

Primary Examiner—Brian Healy
Assistant Examiner—Jennifer Doan
(74) Attorney, Agent, or Firm—Juliana Agon

(57) ABSTRACT

An optical fiber is interfaced with an optical device formed on a substrate. The substrate includes a groove under and behind an interface between the optical fiber and the optical device. Provision of such a groove allows the substrate to be used for alignment and support of the optical fiber, while reducing fusion loss and improving durability of the interface. Steps for facilitating alignment may be provided in the substrate. Solder may be used to further improve durability of the interfaced structure.

16 Claims, 1 Drawing Sheet

METHOD FOR FUSION PIGTAILING AN OPTICAL FIBER TO AN INTEGRATED OPTICAL DEVICE AND RESULTANT STRUCTURES

BACKGROUND OF THE INVENTION

The present invention is directed to a method of fusion pigtailing an optical fiber to an integrated optical device and structures formed thereby.

The term pigtailing generically refers to interfacing an optical fiber with an optical device, e.g., a light source, a detector, a waveguide, etc. Current techniques for securing this interface include bonding, welding, and fusing the optical fiber and the optical device.

In current fusion pigtailing processes, a laser, e.g., a $CO_2$ laser, is used as a heat source to fuse an optical fiber to a device. This process is sufficient for a small number of ports on a substrate. However, the mechanical strength of the fused joints decreases with increasing chip size.

This decrease in mechanical strength is due to the formation of imperfectly melted joints. The imperfect melting arises when a substrate on which the device is formed has a low thermal conductivity. This low thermal conductivity results in poor diffusion of heat in the depth direction of the substrate. This poor diffusion leads to a large temperature difference between the clad surface layer and the lower part of the core of the fused joint. The mechanical strength may be improved by increasing the power of the laser used for fusing the fiber and the device.

However, since the fiber and the device are being fused together, rather than using another material to secure the interface, power should be kept to the minimal level required for this fusion process. An increase in power also results in an increase in optical loss. This increase in optical loss arises from the higher temperature associated with an increase in power, which may deform the shape of the fiber and/or the device.

Thus, for current fusing methods, if the laser energy is high enough to provide strong fusion, fusion loss is increased. However, if the laser energy is low enough to avoid fusion loss, strong fusion cannot be achieved.

Attempts to create strong fusion without increasing the energy level include providing a heater under the waveguide for preheating or reducing the thickness of the substrate having the waveguide at the interface. However, current solutions involve an interface at which no portion of the substrate is below the fiber. This requires the use of additional elements, such as a fiber carrier, which then must be aligned with and attached to the substrate. Usually, the use of a fiber carrier will also involve using a reinforcing plate.

SUMMARY OF THE PRESENT INVENTION

The present invention is therefore directed to a method of fusion pigtailing an optical fiber and an optical device, a structure to be fused to an optical fiber, and the structure formed thereby, which substantially overcomes one or more of the problems due to the limitations and disadvantages of the related art.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which FIGS. 1C and 1D also illustrate resultant structures, before and after the optical fiber is interfaced, respectively, in accordance with the present invention.

DETAILED DESCRIPTION OF PREFERRED EMBODIMENTS

Figure 1A:
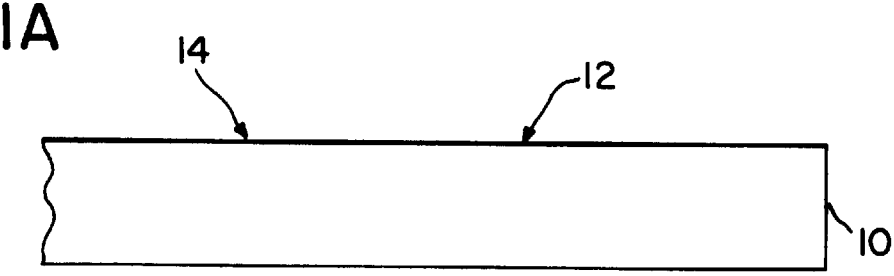
FIGS. 1A–1D illustrate the fusion pigtailing process in accordance with the present invention.
Figure 1B:
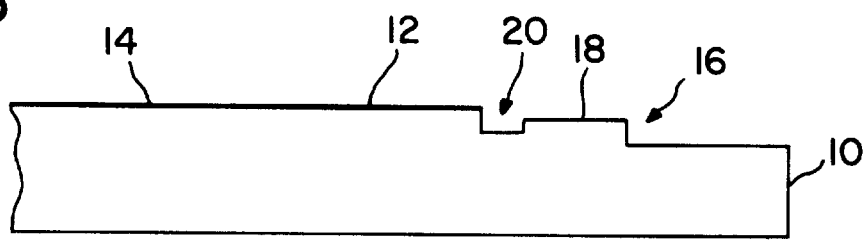
Figure 1C:
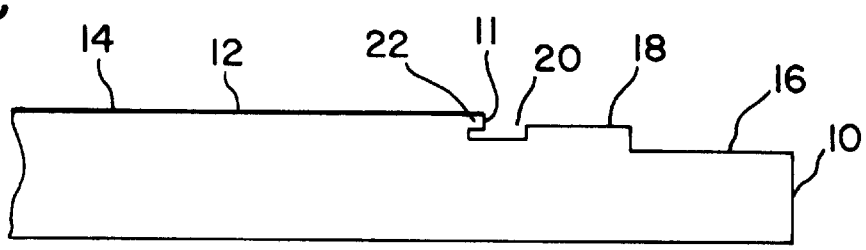
Figure 1D:
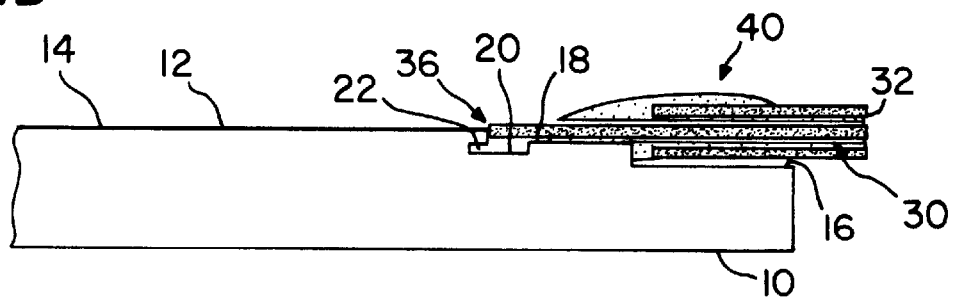

The process of fusion pigtailing an optical fiber in accordance with the present invention is shown in FIGS. 1A–1D. In particular, FIG. 1A shows a device, here a waveguide, on a substrate before processing in accordance with the present invention. FIGS. 1B and 1C show the modifications made to the structure in FIG. 1A. FIG. 1C is the resultant structure for receiving an optical fiber. FIG. 1D shows the resultant structure with an optical fiber mounted thereon.

FIG. 1A illustrates a substrate 10, e.g. a silica chip, with an optical device, e.g., a waveguide 12, formed thereon. An overclad layer 14 is preferably formed on the waveguide 12. Steps are then formed in the substrate 10 by dicing the structure in FIG. 1A to create the structure of FIG. 1B. Alternatively, the steps could be formed using other techniques, e.g., ultrasonic machining. As shown in FIG. 1B, these steps are constructed from a first indentation 16, a second indentation 18, and a third indentation 20.

All of the indentations formed in the substrate 10 are lower than the waveguide 12. As shown in the example of FIG. 1B, the first indentation 16 is the deepest of the three, the second indentation 18 is the shallowest of the three, with the third indentation 20 having a depth between the depths of the other two indentations.

The first and second indentations 16, 18 together form an alignment structure for the fiber to be mounted thereon, with the relative difference in the depths of the first and second indentations being determined in accordance with the thickness of the housing of an optical fiber to be mounted thereon. In other words, the indentations 16, 18 serve to align an end face of the optical fiber with the waveguide 12, as shown in FIG. 1D and discussed in connection therewith.

The third indentation 20 is formed to allow creation of a groove 22 as shown in FIG. 1C. Thus, the depth of the third indentation 20 is determined in accordance with a desired thickness of a portion 11 of the substrate 10 over the groove 22 and a desired depth of the groove 22 under this portion 11. The groove 22 may be formed, for example, with a wire-saw or with ultrasonic machining.

The desired thickness of the portion 11 is determined in accordance with the thermal conductivity of the substrate material. The thickness of the portion 11 is preferably small enough to allow substantially uniform heating over the portion 11 at the fusing temperature. If the portion 11 is too thick, the same problems will arise as if the groove was not provided at all. If the portion 11 is too thin, the temperature on the portion 11 may become too high, and result in damage to the waveguide.

The other physical parameters of the groove also need to be considered in order to achieve the desired uniform heating along the joint. The depth of the groove 22 should be great enough to allow sufficient insulation of the portion 11 such that the desired substantially uniform heating of the portion 11 may be realized. The length of the groove 22 also influences the temperature effects of the groove 22. The optimum length of the groove 22 depends on the thermal characteristics of the substrate 10, the thickness of the portion 11, and the required strength of the substrate.

For example, when the substrate 10 is silica, the thickness of the portion 11 is preferably between 85 microns and 500 microns, the depth of the groove is preferably between 100 and 200 microns, and the length of the groove is preferably up to 400 microns. More specifically for example, the portion 11 having a thickness of 140 microns, a depth of 120 microns and a length of 300 microns is sufficient to reduce the heat capacity difference between a silica substrate and the optical fiber to be mounted thereon, while not weakening the silica substrate.

Thus, FIG. 1C illustrates the structure including the waveguide 12 to which an optical fiber is to be mounted. The mounting of the optical fiber may be performed using laser fusion just at the fusion temperature, as currently performed. By reducing the thickness of the area to be fused with the optical fiber, the difference in temperature due to the bad diffusion of heat in the depth direction is reduced, thereby improving the joint.

FIG. 1D illustrates the pigtailed structure in which an optical fiber 30 in a housing 32 is secured to the waveguide 12 at an end face 36 of the optical fiber 30. As shown in FIG. 1D, an adhesive 40, such as a polymer or mineral glue, preferably is provided to insure the alignment of the fiber is maintained. This adhesive 40 preferably is provided at a location removed from the fused joint and over at least a portion of both the first and second indentations 16, 18 provided for alignment.

In accordance with the present invention, by providing a horizontal groove in a substrate below a device to be fused with an optical fiber, fused joints having an improved mechanical strength, e.g., greater than 5N, and low optical loss, e.g., less than 0.2 dB/interface, on a large chip size, e.g., greater than 3 mm, may be realized.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A method of forming a structure to receive an optical fiber to be pigtailed thereto comprising:
    providing an optical device on a substrate;
    providing a mount region on the substrate to receive the optical fiber; and
    forming a groove in the substrate below the optical device such that a portion of the substrate remains directly beneath the optical device and another portion of the substrate is removed from beneath the optical device, the optical fiber to be attached to the optical device at a portion above the groove.

2. The method of claim 1, wherein said providing a mount region includes forming a step in the substrate which receives the optical fiber in a housing.

3. The method of claim 1, wherein said providing an optical device includes providing a waveguide as the device.

4. A method of pigtailing an optical fiber to a optical device on a substrate comprising:
    forming a groove in a substrate below the optical device such that a portion of the substrate remains directly beneath the optical device and another portion of the substrate is removed from beneath the optical device;
    providing the optical fiber on the substrate; and
    attaching the optical fiber to the optical device at a portion above the groove.

5. The method of claim 4, further comprising, prior to said attaching, aligning the optical fiber and the optical device.

6. The method of claim 5, wherein said aligning includes forming a step in the substrate in accordance with a size of the optical fiber in its housing and a size of the optical fiber itself.

7. The method of claim 4, wherein said attaching includes laser fusing the optical fiber to the portion above the groove.

8. The method of claim 4, further comprising forming a mechanical rear joint on the optical fiber.

9. The method of claim 8, wherein said forming a mechanical rear joint includes, after said attaching, providing an adhesive on the optical fiber separated from where the optical fiber is attached to the portion above the groove.

10. The method of claim 4, further comprises providing a waveguide as the optical device.

11. A structure for receiving an optical fiber to be pigtailed thereto comprising:
    an optical device formed on a substrate;
    a mount region on the substrate to receive the optical fiber; and
    a groove in the substrate below the device such that a portion of the substrate remains directly beneath the optical device and another portion of the substrate is removed from beneath the optical device, the optical fiber to be attached to the optical device at the portion above the groove.

12. The structure of claim 11, wherein said mount region includes a step in the substrate to receive the optical fiber in a housing and to align the optical fiber with the optical device.

13. The structure of claim 11, wherein the optical device is a waveguide.

14. A pigtail structure comprising:
    an optical device formed on a substrate;
    a mount region on the substrate to receive an optical fiber;
    a groove in the substrate below the device such that a portion of the substrate remains directly beneath the optical device and another portion of the substrate is removed from beneath the optical device; and
    an optical fiber positioned on the mount region and attached to the optical device at the portion above the groove.

15. The device of claim 14, wherein said mount region includes a step in the substrate, a size of which is determined in accordance with a size the optical fiber, a size of a housing for the optical fiber, and a position of the optical device.

16. The device of claim 14, wherein said optical fiber is attached to the portion above the groove by a laser fusion joint.

* * * * *